Patented Apr. 23, 1940

2,198,217

UNITED STATES PATENT OFFICE 2,198,217

PROTECTING CREAM AGAINST OXIDATION

Sidney Musher, New York, N. Y., assignor to Musher Foundation Incorporated, New York, N. Y., a corporation of New York No Drawing. Application July 19, 1939, Serial No. 285,354

6 Claims. (Cl. 99—163)

This invention relates to improved methods for retarding oxidative deterioration and the development of oxidized, tallowy, metallic and "cardboard" flavors in cream and similar dairy compositions containing butterfat in the discontinuous phase and having the normal proportion of serum solids or milk solids not fat.

Cream normally contains between 30% and 35% total fat in the discontinuous phase of the butterfat emulsion and about 6% of serum solids, these being primarily protein such as casein, milk sugar or lactose and some phospholipin materials.

It has been found that the off tastes and off odors, such as fishiness, which develop readily in cream are due primarily to the serum solids portion set forth above and particularly to the phospholipin portion. These materials in the usual amounts in which they occur in cream appear to increase the tendency of the cream toward deterioration.

An object of this invention is therefore to stabilize cream and similar dairy compositions in an inexpensive and readily acceptable manner and retard the development of tallowy, metallic, oxidized, fishy and other similar off odors and off flavors.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, to cream containing its normal proportion of milk serum solids and its normal proportion of butterfat, are added relatively small proportions of concentrated or preferably dried milk serum solids or milk solids not fat followed by a heat treatment, whereby the cream is materially stabilized against oxidative deterioration.

Even though the normal quantities of serum solids apparently act to accelerate deterioration of the cream, the addition of serum solids to cream followed by an elevated temperature treatment has been observed to give rise to a most surprising stabilizing effect.

This elevated temperature treatment should preferably be substantially above 145° F. and is carried out desirably at 155° F. to 180° F. or above for a period of from 10 seconds to 15 minutes or more.

The serum solids are added in an amount varying from 1% to 15% against the butterfat weight of the cream, the amount added dependent upon the degree of protection against oxidized flavors that is desired and the susceptibility of the cream to oxidation.

It is important that the serum solids be added to normal cream since this process does not appear to be desirably carried out with cream containing a greater concentration of butterfat than normal nor does it appear possible to carry out this procedure with creams containing less than the normal content of serum solids.

It has been found important that in liquid dairy cream the proportion of butterfat should not be below about 20% nor above about 40% and the proportion of serum solids not below about 5% nor above about 7.5%, and before the heat treatment, the amount of serum solids is desirably increased to about 8% or 9% and at least 1% to 2% above and preferably 3% above the normal serum solids content.

Example I

To cream containing 30% butterfat and 6% serum solids was added 3 parts per million of $CuSO_4$ and the cream divided into two lots as follows:

Cream A. Heated to 170° F. for 5 minutes.

Cream B. Treated with 2.0% of powdered skim milk and then heated at 170° F. for 5 minutes.

The creams were set aside at 45° F. and tested for tallowiness and deterioration at regular intervals with the following results (the number of + signs indicating degree of deterioration):

|  | After— | | |
| --- | --- | --- | --- |
|  | 24 hours | 48 hours | 72 hours |
| Cream A | + | ++ | ++++ (inedible) |
| Cream B | - | ± | + |

Heat treatments of 145° F. are insufficient to show the most desirable stabilizing action that is particularly observed at 155° F. and preferably at 170° F. or above. Temperatures as high as 250° F. or higher even though for only minute fractions of a minute are satisfactory and are generally superior to longer holding periods at lower temperatures.

In place of heating, or preferably in addition to the heat treatment, homogenization may also be resorted to in order to produce the stabilizing action. The more intimate contact of the fat globules with the increased serum solids at the temperature of activation results in marked stabilization.

Example II

30% butterfat and 6% serum solids containing cream to which was added 3 p.p.m of $CuSO_4$ was prepared as follows:

Cream A. Treated with 3.0% of powdered skim milk thoroughly admixed therein and then heated at 180° F. for 1 minute.

Cream B. Heated at 180° F. for 1 minute and then thoroughly admixed with 3.0% of powdered skim milk.

The creams were tested as before:

|  | After— | | |
| --- | --- | --- | --- |
|  | 24 hours | 48 hours | 72 hours |
| Cream A | − | − | ± |
| Cream B | ± | ++ | +++ |

It may be observed that where the heat treatment was given after addition of the serum solids a desirable improvement was observed, but where the heat treatment was given before the addition, deterioration took place rapidly.

Example III

To 35% butterfat containing cream contaminated with 3 p. p. m. of $CuSO_4$ was added and admixed therein 1.0% of powdered buttermilk and heated as follows:

Cream A. Heated at 145° F. for 30 minutes.
Cream B. Heated at 170° F. for 5 minutes.
Cream C. Heated at 200° F. for 30 seconds.

The creams were examined with the following results:

|  | After— | | |
| --- | --- | --- | --- |
|  | 24 hours | 48 hours | 72 hours |
| Cream A | ± | + | ++ |
| Cream B | − | ± | ± |
| Cream C | − | − | − |

The exact mechanism by which this invention is operative is not well understood. Although the added serum solids are water soluble and remain substantially in the water phase, nevertheless the fat of the cream is protected against deterioration.

This is in direct contradistinction to the generally accepted fact that the availability and effectiveness of an antioxidant is dependent upon how thoroughly it is dispersed throughout the body of the fat or oil subject to oxidation whereas, in accordance with this invention, the milk serum solids are dispersed throughout the aqueous continuous phase to protect the discontinuous butterfat phase and are not dispersed throughout the discontinuous butterfat phase subject to oxidation.

In addition, whereas it is normally recognized that the milk serum solids appear to be responsible for the development of fishiness and other off flavors in milk, cream or butter, it is necessary in accordance with this invention to add the serum portion to the cream and then to heat in order to retard this fishiness. Moreover, whereas lecithin, as one of the phosphatides that shows antioxidant activity, is recognized as becoming inactivated as an antioxidant when heated to in excess of 65° C., nevertheless the effectiveness of the serum solids containing phosphatides is only observed when they are added to the aqueous continuous phase of the cream and the cream then heated to a substantially elevated temperature.

Where the temperature is less than 145° F., there is substantially no improvement in keeping quality observed. The improvement is therefore not dependent upon reaching merely the melting point of the butterfat contained in the cream, for it is recognized that butterfat will normally melt at a temperature less than about 100° F. and it requires a minimum temperature of approximately 145° F. in order to show the desired antioxidant activity of the milk serum solids for addition to the cream subject to oxidation.

The cream that is treated in the aforesaid manner may be used for subsequent manufacture into powdered or liquid ice cream, sherbets, whipping cream, cream cheese and other cheeses, powdered cream and other products derived from cream or made with the substantially stabilized cream and such products made with the stabilized cream will themselves also be substantially stabilized against oxidative deterioration.

In addition, the cream that is thus treated may be frozen for storage and held for periods ranging up to 6 months to a year or more at temperatures of 20° F. or below under which conditions the original fresh flavor of the cream will be substantially retained and the development of tallowy and oxidized flavors will be very materially retarded.

Example IV

30% cream with 6% serum solids containing 3 p. p. m. of $CuSO_4$ was prepared as follows:

Cream A. Treated with 5.0% powdered skim milk thoroughly admixed therein and heated at 185° F. for 2 minutes;

Cream B. Heated at 185° F. for 2 minutes and then treated with 5.0% powdered skim milk thoroughly admixed therein.

The cream was stored at 10° F. for 90 days and then used in the manufacture of strawberry ice cream. The degree of oxidized flavors observed with ice cream is given in the following table:

|  | Ice cream after— | | |
| --- | --- | --- | --- |
|  | 0 days | 10 days | 20 days |
| Using cream A | − | ± | + |
| Using cream B | + | ++ | ++++ (inedible) |

Included in the serum solids that may be used in accordance with this invention are those comprising powdered or concentrated skim milk and powdered or concentrated buttermilk, whey, and similar products derived substantially from milk serum solids. There may also be included the lower fat containing milk serum materials such as partially skimmed powdered whole milk, etc. Although the substantially dried or dehydrated serum products are desirable for use, there may also be included the concentrated or evaporated milk products including concentrated or plastic buttermilk, condensed whey, separator residue, etc.

Extracts of these materials are also included such as particularly the alcohol soluble or water soluble extract or other extract using an OH solvent of a low molecular weight aliphatic group, or lactose (milk sugar), casein (milk protein), milk phospholipin, etc.

There may also be employed mixtures of lactose (milk sugar) and casein (milk protein), lactose and phosphatides such as lecithin, etc. These materials similarly require activation under conditions of heat.

Example V

The cream used in Example IV was

A. Treated with 2.0% of a mixture of equal parts of lactose and casein thoroughly admixed therein and heated to 190° F. for 15 seconds; and cooled.

B. Heated to 190° F. for 15 seconds, cooled, and then treated with 2.0% of the mixture of lactose and casein thoroughly admixed therein.

|  | After— | | |
|---|---|---|---|
|  | 24 hours | 48 hours | 72 hours |
| Cream A | ± | + | + |
| Cream B | + | ++ | ++++ |

In place of powdered skim milk there may also be employed other similar stabilizing mixtures made up of combinations of powdered skim milk with other products. For example, there may be utilized a mixture comprised of 90% powdered skim milk, 5% lecithin and 5% dextrose, or a mixture comprising 85% powdered skim milk and 15% lecithin, or a mixture comprising 98% powdered buttermilk and 2% tartaric acid.

Where lecithin is used with powdered skim milk, the addition of the lecithin can be made to the skim milk while in liquid condition and that mixture subjected to homogenization in order to thoroughly mix in the lecithin with the milk and then powdering the mixture. This homogenized lecithin mixture may be used for addition to cream and then subjected to the elevated temperature to develop antioxygenic activity.

Where the treated cream containing the heat reacted milk serum solids is to be used in the manufacture of an ice cream mix, it is desirable for the cream to be heated to a temperature of at least 165° F. or higher prior to the addition of the sugar required in the ice cream mix in order to avoid excess carbonization or caramelization of the sugar. For example, in an ice cream mix where 10% of sugar is normally added, the milk serum solids may be added to the cream and that mixture heated to a temperature of, for example, 165° F. or higher, allowed to cool, and then such sugar, flavoring and other constituents may be added as normally used in the manufacture of the ice cream mix.

Another method for the utilization of this invention is to separate ordinary milk into the cream and skim milk portion. The cream is then stabilized by adding to it a relatively small proportion of milk serum solids and then heated to an elevated temperature such as preferably to about 180° F. and, following this heat treatment, the cream is recombined with the skim milk in order to very materially improve the keeping quality of the recombined milk.

Example VI

Milk containing 3.5% of butterfat was separated into skim milk and a 35% buttterfat containing cream. Before separating, the milk was contaminated by adding to it 3 p. p. m. of copper as copper sulphate. The separated skim milk portion was heated to 145° F. for 30 minutes and then cooled. To the separated cream portion was added 1.5% by weight of powdered skim milk, thoroughly mixed in the cream and then heated to 180° F. for 5 minutes and cooled. The cream and skim milk were then recombined to reform the milk. The milk prepared in this manner was found to be substantially stabilized against oxidative deterioration and did not develop metallic, oxidized or tallowy flavors within a 72 hour period.

This treatment is particularly desirable in view of the fact that if ordinary whole milk were heat treated at 180° F., for example, for 5 minutes caramelization and scorching of the milk would result, whereas by separating the milk into its cream portion and skim milk portion, the cream may be treated in the aforesaid manner by adding to it a small proportion of serum solids, heating the cream to temperatures substantially in excess of that which would normally produce caramelization of the milk such as to about 180° F., heating the skim milk portion to temperatures under that of caramelization, such as to about 145° F. or below, and then recombining the cream and skim milk portions to obtain a milk that will be substantially stabilized against oxidative deterioration.

This application is a continuation in part of application, Serial Number 237,466, filed October 28, 1938.

Having described my invention, what I claim is:

1. The process of stabilizing cream against oxidative deterioration, said cream containing about 30% to 35% butterfat, said cream containing the normal proportion of serum solids to butterfat, which comprises adding to said cream 3% of powdered skim milk and dispersing said skim milk in the cream, and then heating the cream to 170° F. for 6 minutes whereby there is produced a cream which will be highly resistant to the development of tallowiness and oxidative deterioration.

2. The process of stabilizing cream against oxidative deterioration, said cream containing about 30% to 35% butterfat, said cream containing the normal proportion of serum solids to butterfat, which comprises adding to said cream about 3% of serum solids and dispersing said solids in said cream, and then heating the cream to about 170° F. whereby there is produced a cream which will be highly resistant to the development of tallowiness and oxidative deterioration.

3. The process of stabilizing cream against oxidative deterioration, said cream containing about 30% to 35% butterfat, said cream containing the normal proportions of serum solids to butterfat, which comprises adding to said cream about 1% to 15% of serum solids, heating to substantially above 145° F. for a short period and then cooling, whereby there is produced a stabilized cream which will maintain a high score even when stored for a long period of time.

4. A stabilized cream, containing about 30% to 35% butterfat, said cream being highly resistant to the development of oxidized tastes and flavors and resisting oxidative deterioration even when contaminated with copper sulphate, said cream containing the reaction product of between about 1% to 15% of added milk serum solids over and above the normal milk serum solids content thereof, said reaction product having been formed by heating said milk serum solids with the cream at a temperature of between about 145° F. and 170° F.

5. A dairy composition containing butterfat in the discontinuous phase and an aqueous medium in the continuous aqueous phase, said dairy composition being substantially stabilized against oxidative deterioration, said composition containing a small amount of the reaction product of added milk serum solids, said reaction product having been formed by heating the added milk serum solids with the dairy composition at a temperature above 145° F.

6. The process of stabilizing cream against oxidative deterioration, said cream containing the normal proportion of serum solids to butterfat, which comprises adding to said cream a small but substantial additional amount of concentrated serum solids and dispersing said solids in the aqueous phase of the cream, and then heating the cream to at least 145° F. whereby there is produced a cream which will be highly resistant to the development of tallowiness and oxidative deterioration.

SIDNEY MUSHER.